(12) United States Patent
Toedter

(10) Patent No.: US 6,172,643 B1
(45) Date of Patent: Jan. 9, 2001

(54) NAVIGATION DEVICE

(75) Inventor: Werner Toedter, Nordstemmen (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/316,494

(22) Filed: May 21, 1999

(30) Foreign Application Priority Data

May 22, 1998 (DE) .............................................. 198 22 919

(51) Int. Cl.⁷ ..................................................... G01S 5/02
(52) U.S. Cl. ........................................... 342/417; 701/213
(58) Field of Search ............................... 342/417, 357.06; 701/213

(56) References Cited

U.S. PATENT DOCUMENTS 4,651,282 * 3/1987 Robinson et al. .
5,483,664 * 1/1996 Moritz et al. ........................ 455/13.1

* cited by examiner

Primary Examiner—Theodore M. Blum
(74) Attorney, Agent, or Firm—Kenyon & Kenyon

(57) ABSTRACT

In a navigation device for a motor vehicle in which a standby operation is provided with limited power consumption, the standby operation is maintained for a period of time after the vehicle ignition and/or the navigation device is switched off, the period of time depending on the previous operating state of the navigation device. The navigation device is switched off afterwards.

5 Claims, 2 Drawing Sheets

NAVIGATION DEVICE

FIELD OF THE INVENTION

The present invention relates to a navigation device for a motor vehicle in which a standby operation is provided with limited power consumption.

BACKGROUND INFORMATION

To an increasing degree, motor vehicles are being equipped with navigation devices which make it easier for the driver to reach his/her destination by appropriate indications on a display or by spoken messages. The data necessary for this purpose are generally obtained from a stored road map, a location finder (GPS) or by other sensors such as a map measurer and compass. Electrical power is required to operate these devices, it being possible to obtain this power without difficulty from the vehicle battery which is constantly being recharged during travel. However, extended operation of the navigation device with the engine shut off can result in an undesired drainage of the battery. For that reason, navigation devices are switched off if the motor vehicle is not used for an extended period of time.

However, in order to be able to recover all functions of the navigation device immediately after a short pause, a standby operation is provided in known navigation devices in which the power consumption is in fact limited; however, the most important functions for a fast recovery of operation are preserved.

SUMMARY OF THE INVENTION

An object of the present invention is to further improve the known navigation devices with respect to power consumption and a fast resumption of operation after being restarted.

According to the present invention, this object is achieved in that means are provided which maintain the standby operation for a period of time after the vehicle ignition and/or the navigation device is switched off, the period of time depending on the previous operating state of the navigation device, and which switch the navigation device off afterwards.

The navigation device according to the present invention is based on the knowledge that standby operation of the navigation device for an extended period of time after the ignition is switched off can be of considerable value in many cases while a short period of time is sufficient in other situations.

Advantageously, the navigation device according to the present invention provides that the period of time of the standby operation is longer than in other operating states if the ignition is switched off during an initial operating state in which navigational guidance was active and not completed by reaching the destination. Consequently, the driver of a motor vehicle can reasonably take extended breaks on the way to a destination to which he/she is being guided by the navigation device. The visual or audible directions of the navigation device are available to him/her immediately after resumption of travel.

A further development of the navigation device according to the present invention is that the other operating states are made up of a second and a third operating state, that the second operating state is present after active navigational guidance with the goal being reached and results in a medium period of time of the standby operation and that the third operating state is present if no navigational guidance was activated after a preceding startup of the navigation device and results in a shorter period of time of standby operation.

This further improvement ensures that hardly any additional power consumption takes place for the standby operation if no data for navigational guidance are available after continued travel in any event. It is ensured, however, that with a previous navigational guidance and the arrival at the destination after a medium period of time, the navigational guidance can be continued toward a different destination immediately after being switched on again.

The time periods selected after each of the previous operating states can be adapted to the particular habits of the driver so that the time periods can be set by operator inputs. A favorable setting which covers a large number of applications is preferably given so that the longer period of time amounts to approximately one hour, that the medium period of time amounts to approximately 10 minutes and the shorter period of time amounts to approximately one minute.

DETAILED DESCRIPTION

Figure 1:
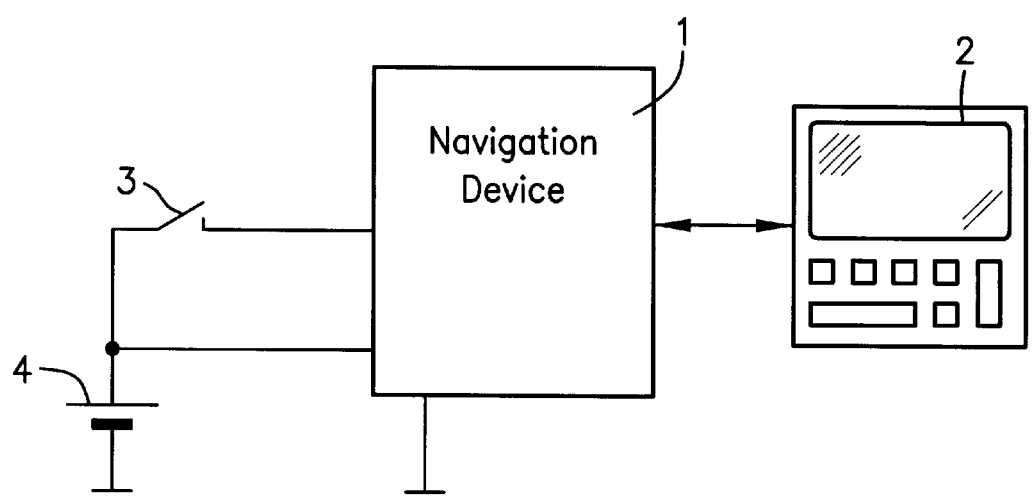
FIG. 1 shows a block diagram of a navigation device according to the present invention.

FIG. 1 shows a navigation device 1 in merely schematic form, since its components, for example, a microcomputer, various sensors and memory are known per se. Navigation device 1 includes a control and display device 2, with the aid of which destinations can be entered, whereupon, for example, the route to the particular destination and the respective position of the vehicle are shown on a display or reported to the driver audibly via a speaker which is not shown here.

The vehicle battery 4 serves as the power supply to which navigation device 1 is connected directly on the one hand and it is connected on the other hand via a switch 3 in the ignition lock. Details of this connection, for example, fuses, are not described here for reasons of clarity. The direct connection between vehicle battery 4 and navigation device 1 serves to supply power for the standby operation which, however, can also be switched off internally. The active operation can also be switched off, in particular via control and display device 2.

Figure 2:
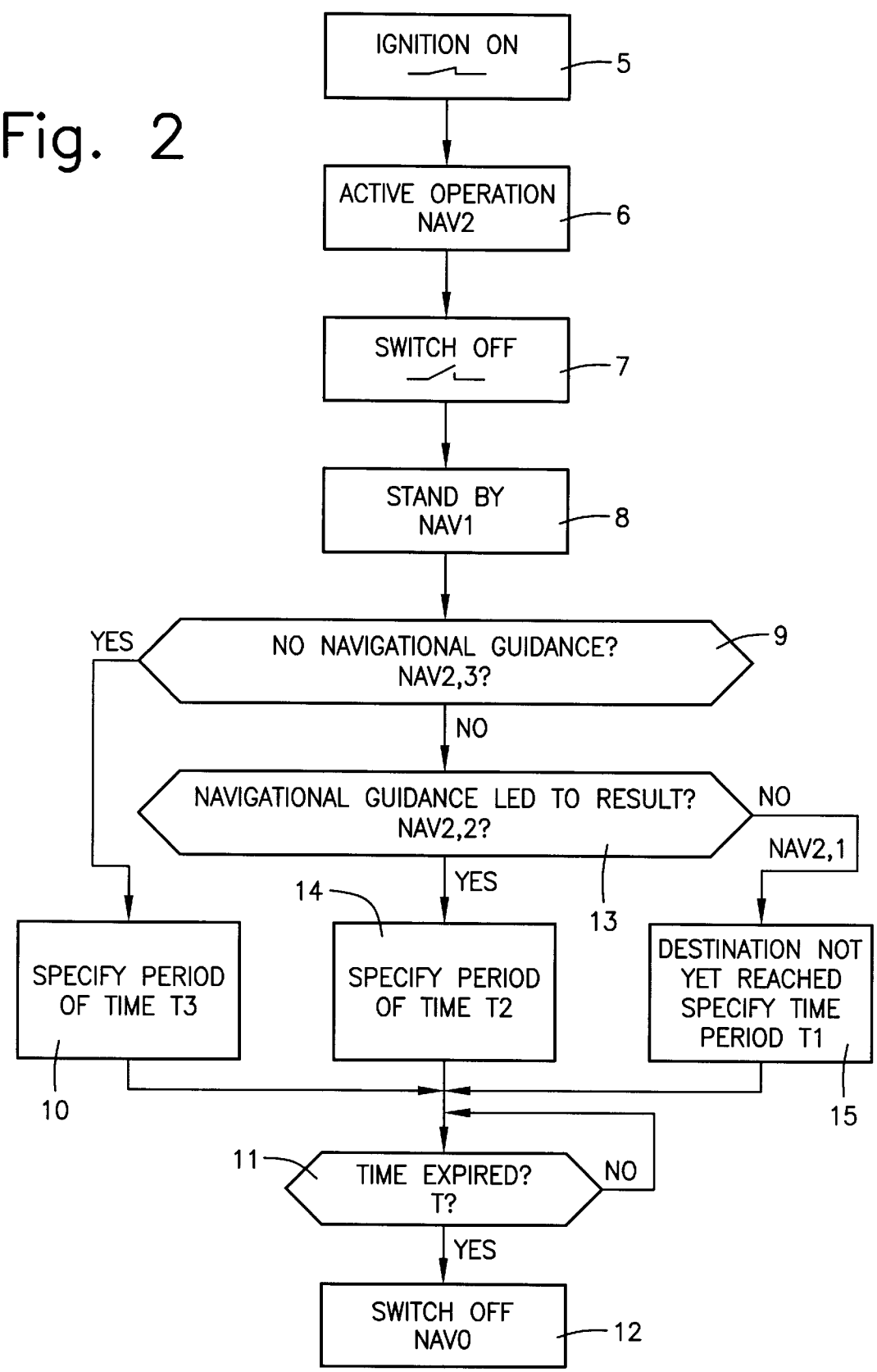
FIG. 2 shows a flow chart of a program in a microcomputer of the navigation device of the present invention controlling the duration of standby operation.

The following designations are used in FIG. 2 to identify the various operating states:

NAV0 for the navigation device when switched off,

NAV1 for standby operation, and

NAV2 for active operation in which active operation without navigational guidance is named NAV2,3, active operation already completed by reaching the destination is named NAV2,2, and active operation not yet completed by reaching the destination is named NAV2,1.

The flow chart according to FIG. 2 starts with turning on the ignition at 5 by closing switch 3 (FIG. 1) or—if navigation device 1 is initially switched off at the time the ignition is turned on—by switching it on with the aid of control and display device 2. After that, the navigation device assumes active operation NAV2 at 6 and shows the driver, for example, the route to a previously entered destination.

At 7, the device is switched off either by opening switch 3 or by a corresponding operation at 2 (FIG. 1) and it goes into standby operation NAV1 at 8.

At 9, the program branches as a function of whether active operating state NAV2,3 has prevailed during the active operation at NAV2, i.e., no navigational guidance has taken place. If this is the case, period of time T3, for example, one minute, is specified at 10, whereupon the progress of the particular time T is checked in program part 11. If the time has expired, the navigation device is switched off at 12 (NAV0).

However, if it is determined at 9 that navigational guidance took place during the preceding travel (between program parts 5 and 7), the program is branched once more at 13 and specifically as a function of whether the navigational guidance has already led to the result (NAV2,2). If this is the case, the medium period of time T2, for example, 10 minutes, is set at 14 and the navigation device is also switched off at 12 after this time has expired at 11.

However, if it turns out at branching 13 that the destination has not been reached yet, the longer period of time T1 of, for example, 60 minutes is set at 15 and standby operation is maintained for a corresponding length of time.

What is claimed is:

1. A navigation device for a motor vehicle having a standby operation with a limited power consumption, comprising:

an arrangement maintaining the standby operation for a period of time after at least one of a vehicle ignition and the navigation device is switched off, the period of time depending on a previous operating state of the navigation device, the arrangement switching off the navigation device after the period of time.

2. The navigation device according to claim 1, wherein the period of time of the standby operation is longer than in other operating states if the vehicle ignition is switched off during an initial operating state in which a navigational guidance was active and not completed by reaching a destination.

3. The navigation device according to claim 2, wherein the other operating states include second and third operating states, the second operating state being present after an active navigational guidance with a goal being reached, the third operating state being present if no navigational guidance was activated after a preceding start-up of the navigation device, the period of time being longer for the second operating state than for the third operating state.

4. The navigation device according to claim 3, wherein the period of time is set by at least one operator input.

5. The navigation device according to claim 3, wherein the period of time is approximately one hour for the standby operation, is approximately 10 minutes for the second operating state, and is approximately one minute for the third operating state.

* * * * *